US006484273B1

(12) United States Patent
Chang

(10) Patent No.: US 6,484,273 B1
(45) Date of Patent: Nov. 19, 2002

(54) INTEGRATED EJTAG EXTERNAL BUS INTERFACE

(75) Inventor: Paul K. Chang, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/725,543

(22) Filed: Nov. 29, 2000

(51) Int. Cl.[7] .............................................. G06F 11/00
(52) U.S. Cl. ........................................ 714/30; 714/733
(58) Field of Search ............................ 714/30, 31, 34, 714/36, 43, 6, 10, 11, 25, 27, 726, 727, 733

(56) References Cited

U.S. PATENT DOCUMENTS

| | | | | |
|---|---|---|---|---|
| 5,488,688 A | * | 1/1996 | Gonzales et al. | 714/34 |
| 5,544,311 A | * | 8/1996 | Harenberg et al. | 714/40 |
| 5,668,815 A | * | 9/1997 | Gittinger et al. | 714/719 |
| 5,964,893 A | * | 10/1999 | Circello et al. | 714/39 |
| 5,978,902 A | * | 11/1999 | Mann | 712/227 |
| 5,978,937 A | * | 11/1999 | Miyamori et al. | 714/45 |
| 6,026,501 A | * | 2/2000 | Hohl et al. | 714/38 |
| 6,075,941 A | * | 6/2000 | Itoh et al. | 395/704 |
| 6,094,729 A | * | 7/2000 | Mann | 714/25 |
| 6,145,123 A | | 11/2000 | Torrey et al. | 717/4 |
| 6,185,731 B1 | * | 2/2001 | Maeda et al. | 717/4 |
| 6,202,172 B1 | * | 3/2001 | Ponte | 714/31 |
| 6,209,045 B1 | * | 3/2001 | Hasegawa et al. | 710/15 |
| 6,263,373 B1 | * | 7/2001 | Cromer et al. | 709/250 |

OTHER PUBLICATIONS

IEEE Standard Test Access Port and Boundary–Scan Architecture, IEEE Std. 1149.1–1990, pp. 1–127 (plus i–vi supplemental).

Supplemental to IEEE Std. 1149.1–1990, IEEE Standard Test Access Port and Boundary–Scan Architecture, 1995, pp. 1–68.

MIPS EJTAG Debug Solution 980818 Rev. 2.0.0, 1997, 1998, pp. 1–121.

\* cited by examiner

Primary Examiner—Nadeem Iqbal
(74) Attorney, Agent, or Firm—Christopher P. Maiorana, P.C.

(57) ABSTRACT

An apparatus comprising a processor and an interface. The processor may be configured to support system-on-chip debugging. The interface circuit may be coupled to the processor and configured to interface with an external bus. Reading and writing commands of the processor may be integrated with the system-on-chip debugging.

21 Claims, 2 Drawing Sheets

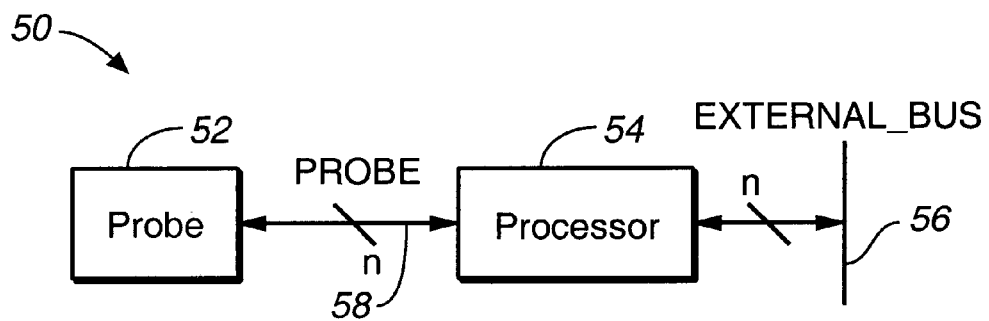
FIG._1
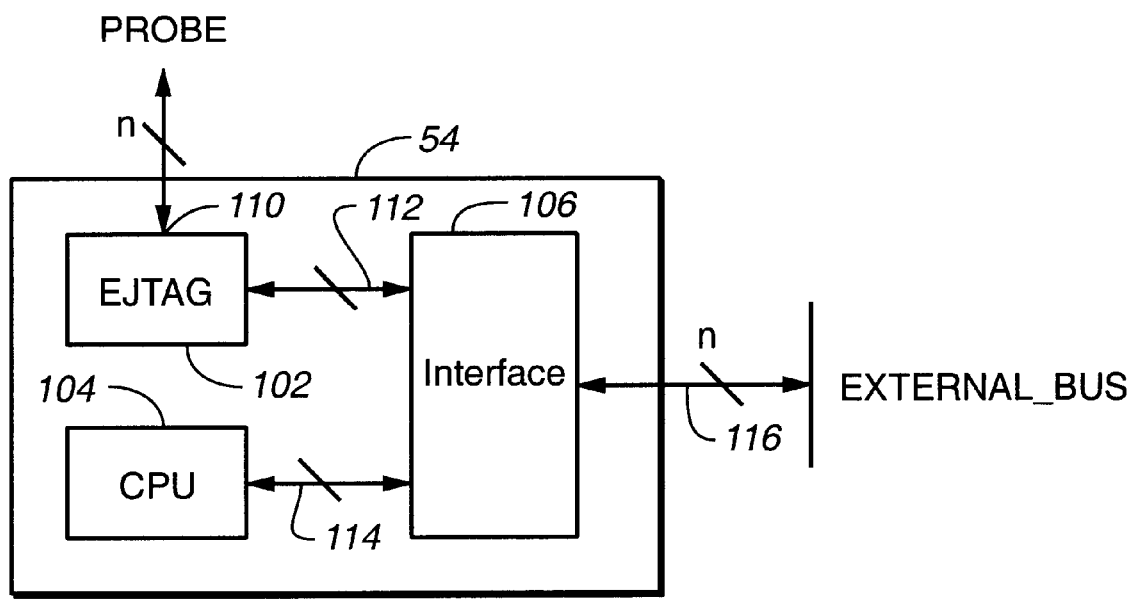
FIG._2

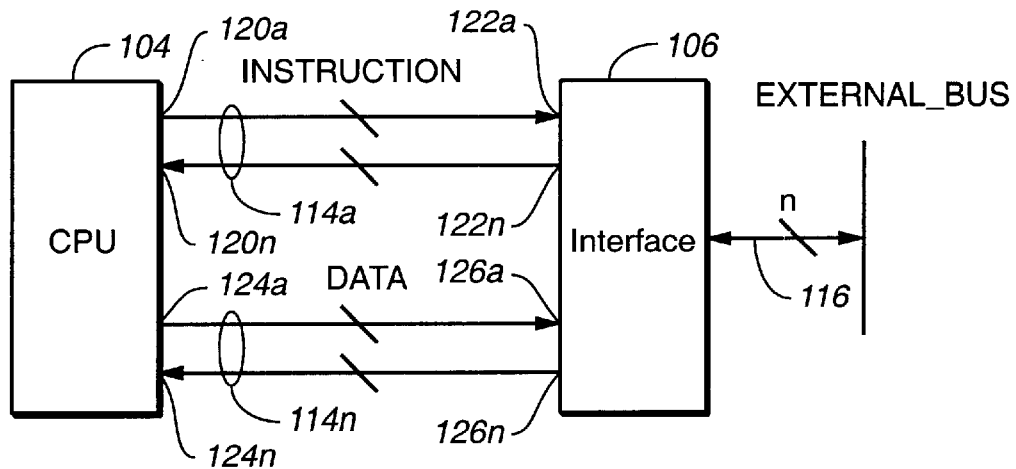
FIG._3
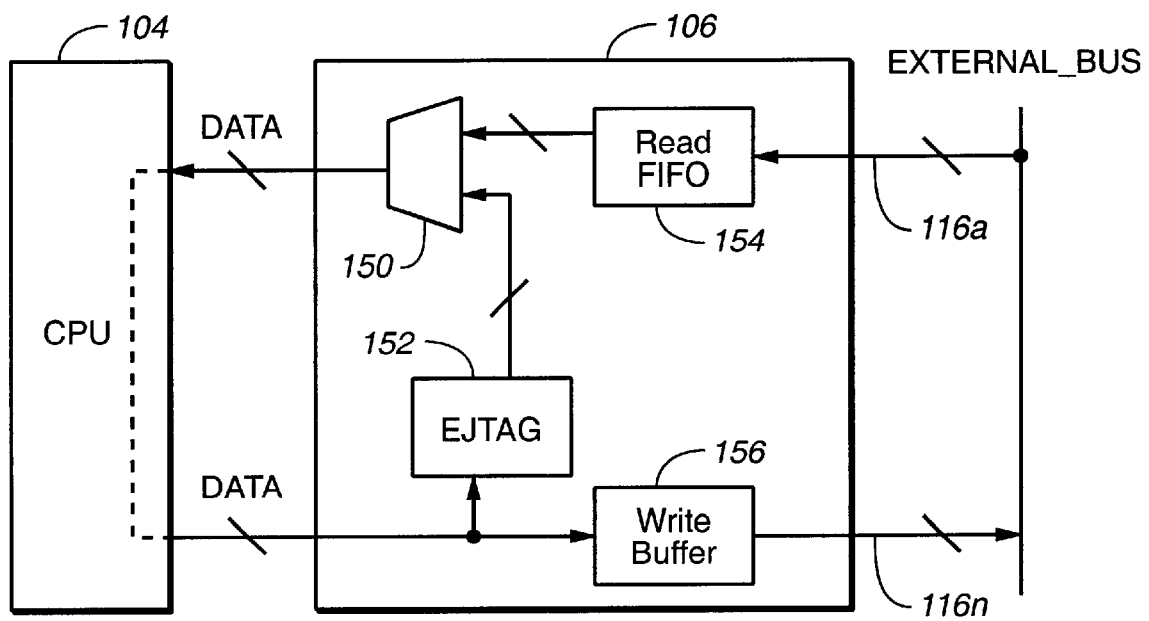
FIG._4

INTEGRATED EJTAG EXTERNAL BUS INTERFACE

FIELD OF THE INVENTION

The present invention relates to a method and/or architecture for implementing a bus interface unit in a microprocessor core generally and, more particularly, to a method and/or architecture for integrating an EJTAG interface with an external bus.

BACKGROUND OF THE INVENTION

High performance 32-bit and 64-bit Reduced Instruction Set Computer (RISC) processors are an important part of digital consumer electronics, information appliances, set-top boxes, and office automation applications. However, effective debug and development tools for high performance RISC processors remains a concern. Additionally, debugging and hardware/software integration is a significant burden to prototype development and ultimately to market opportunity window.

It would be desirable to provide a method and/or architecture that can reduce die space, complexity and design overhead in the design of integrated circuits.

SUMMARY OF THE INVENTION

The present invention concerns an apparatus comprising a processor and an interface. The processor may be configured to support system-on-chip debugging. The interface circuit may be coupled to the processor and configured to interface with an external bus. Reading and writing commands of the processor may be integrated with the system-on-chip debugging.

The objects, features and advantages of the present invention include providing a method and/or architecture for implementing a microprocessor core with a bus interface unit implementing an integrated EJTAG interface that may (i) reduce die space, complexity and overhead; (ii) provide a non-intrusive development and debug technology; (iii) provide real time debug features; (iv) eliminate a need for an independent interface to an external bus; (v) simplify the bus interface unit; and/or (vi) simplify the EJTAG interface.

BRIEF DESCRIPTION OF THE DRAWINGS

These and other objects, features and advantages of the present invention will be apparent from the following detailed description and the appended claims and drawings in which:

FIG. 1 is a block diagram of a preferred embodiment of the present invention;

FIG. 2 is a detailed block diagram of the present invention;

FIG. 3 is a more detailed block diagram of the present invention; and

FIG. 4 is a block diagram illustrating an operation of the present invention.

DETAILED DESCRIPTION OF THE PREFERRED EMBODIMENTS

Referring to FIG. 1, a block diagram of a circuit (or system) 50 is shown in accordance with a preferred embodiment of the present invention. The circuit 50 generally comprises a probe block (or circuit) 52, a processor block (or circuit) 54 and a bus 56. The probe 52 and the processor 54 may present/receive one or more signal(s) (e.g., PROBE) over a bus 58. The one or more signals PROBE may be implemented as test access port (TAP) signals. The probe 52 may initiate and/or control testing of the processor 54. Additionally, the probe 52 may allow a user to access test data for the processor 54. The processor 54 may require a specialized debugging mode including hardware and software implementation. The processor 54 may be implemented as an EJTAG compliant device (e.g., the JTAG Specification, IEEE 1149.1a, published June 1993, the JTAG Specification, IEEE 1149.1b, published September 1994 and/or the EJTAG Specification, published August 1998, which are each incorporated by reference in their entirety.

In one example, the bus 58 may be implemented as a single-bit or multi-bit bus. However, preferably, the signal PROBE (and the bus 58) may be implemented as a 5-bit signal (or bus). For example, a first bit may be implemented as a test reset bit, a second bit may be implemented as a test clock bit, a third bit may be implemented as a test mode select bit, a fourth bit may be implemented as a test data input bit and a fifth bit may be implemented as a test data output bit. However, other bit widths may be implemented accordingly to meet the design criteria of a particular application.

The processor 54 and the external bus 56 may present/receive a number of signal(s) (e.g., EXTERNAL_BUS). In one example, the signal (s) EXTERNAL_BUS may be implemented as a single-bit or multi-bit signal(s). The signal(s) EXTERNAL_BUS may be implemented as bus interface signals (e.g., data signals, address signals, etc.). The signal(s) EXTERNAL_BUS may also interface with other appropriate microprocessor/microcontroller devices (e.g., system memory, I/O devices, etc.).

The processor 54 may provide a non-intrusive development and debug technology that may provide high performance real-time debug features. Additionally, the system 50 may implement such debugging technology at a low system cost. The system 50 may use a pre-existing JTAG boundary scan interface (e.g., the TAP signals PROBE). The system 54 may provide hardware breakpoints, unlimited software breakpoints, and real-time program counter trace with a minimum of hardware overhead. The system 54 may ease hardware/software integration of integrated circuits. The circuit 54 may also significantly reduce system design time and cost.

Referring to FIG. 2, a block diagram of the processor 54 is shown. The processor 54 may provide specialized hardware debugging. The processor 54 may provide such specialized hardware debugging by implementing on-chip debugging circuitry. In one example, the processor 54 may be implemented as a reduced instruction set computer (RISC) processor. In another example, the processor 54 may be implemented as a RISC processor with integrated EJTAG capabilities. However, other processor types may be implemented accordingly to meet the design criteria of a particular implementation.

The processor 54 generally comprises an interface block (or circuit) 102, a central processor unit (CPU) block (or circuit) 104 and an interface block (or circuit) 106. The interface circuit 102 may be implemented as a EJTAG interface circuit. The CPU 104 may be required to provide a specialized debugging mode. The CPU 104 may also be required to provide registers, debugging instructions, or other specialized needs as required by the EJTAG interface 102. The interface circuit 106 may be implemented as a bus interface unit (BIU) circuit. The interface circuit 106 may allow the EJTAG circuit 102 and the CPU 104 to interface with the external bus. The EJTAG interface 102 may be required to interface with the same bus that the CPU 104 generally communicates. The interface circuit 106 may be designed to allow 64-bit debugging by the EJTAG circuit 102 (as discussed in connection with FIGS. 3 and 4).

The circuit 102 may have an input/output 110 that may receive/present the signal(s) PROBE. The circuit 102 may be connected to the circuit 106 through a bus 112. Similarly, the CPU 104 may be connected to the circuit 106 through a bus 114. The circuit 106 may be connected to an external bus 116. The bus interface unit 106 may be implemented within a microprocessor core (e.g., the processor 54).

Referring to FIG. 3, a detailed implementation of the CPU 104 and the interface 106 is shown. The CPU 104 may have a number of inputs/outputs 120a–120n that may present and receive instruction data to a number of input/outputs 122a–122n of the interface 106. Additionally, the CPU 104 may have a number of input/outputs 124a–124n that may present/receive data to a number of input/outputs 126a–126n of the interface 106.

Whenever the CPU 104 requests an instruction fetch, the address and request are first presented to the interface 106 via a group signal (e.g., INSTRUCTION). For example, the signal INSTRUCTION may be presented and/or received by the inputs/outputs 120a and 122a. Next, the instruction fetch data is generally returned to the input 120n of the CPU 104 through a dedicated channel (e.g., the bus 114a). When the CPU 104 requests a data read, an analogous protocol is used (e.g., the data is generally assigned a dedicated request and return channel). The request and address are generally then presented to the interface 106 via a group signal (e.g., DATA). Specifically, the request and address may be presented to the input/output 114n of the interface 106. Next, the data load is generally returned to the CPU 104 through a dedicated channel (e.g., the bus 124n). When the CPU 104 requests a data write, the address, request and data are generally presented to the interface 106 via the group signal DATA on the bus 114n.

Referring to FIG. 4, a detailed implementation of the interface 106 is shown. FIG. 4 may illustrate a 64-bit data interface operation of the CPU 104 and the bus interface 106. The interface 106 is shown interfacing with the CPU 104 and the external bus EXTERNAL_BUS. The interface 106 generally comprises a multiplexer block (or circuit) 150, a block (or circuit) 152, a block (or circuit) 154 and a block (or circuit) 156. In one example, the circuit 152 may be implemented as an EJTAG circuit. In another example, the circuit 152 may represent an external bus portion of the EJTAG interface 102 (e.g., a 64-bit portion of the EJTAG interface 102). The 64-bit external bus EJTAG interface 152 may be easily implemented within the BIU 106, since the interface 106 is already a 64-bit device.

In one example, the circuit 154 (e.g., a read buffer) may be implemented as a first-in first-out (FIFO) buffer and the circuit 156 (e.g., a write buffer) may also be implemented as a FIFO buffer. However, the circuits 154 and 156 may be implemented as other appropriate type devices in order to meet the criteria of a particular implementation. The circuit 154 may buffer signals read from the external bus 116. The buffer 156 may buffer signals written to the bus 116.

The external bus interface EJTAG circuit 152 (of the interface 106), like the EJTAG module 102 (of the processor 54), needs to access the external bus 116 to transmit and receive data to/from external devices (not shown) connected to the external bus 116. The circuit 152 may allow portions of the EJTAG module 102 to be integrated into various existing modules of the processor 54. For example, function (s) that require data from the external bus 116 may be incorporated into the BIU 106. Specifically, the mechanism that transfers 64-bit data required by the EJTAG module may be integrated into the BIU 106. Specifically, the external bus portion EJTAG circuit 152 may be easily implemented within the 64-bit BIU 106. Integration of the 64-bit EJTAG portion 152 may reduce cost overhead and die space.

The CPU 104 may be implemented, in one example, as a microprocessor core that supports a 64-bit EJTAG debug solution. In such an example, the bus interface unit 106 needs to be designed so as to integrate the 64-bit debugging feature. Even though the EJTAG circuit 102 may have a dedicated interface at the core boundary (e.g., the EJTAG probe) a separate connection to the external bus 116 is required (via the interface 106). The external bus 116 may be utilized by both the EJTAG circuit 102 and the CPU 104 via the BIU 106.

The EJTAG external bus interface portion 152 may be tightly coupled in the BIU 106 such that data to and from the EJTAG unit flows through the BIU 106. Even though the EJTAG interface 102 is a completely separate module from the CPU 104, accesses to the external bus appear to resemble requests from the CPU 104. For example, writes to the external bus 116 from the EJTAG circuit 102 may go through the BIU write buffer 156 and reads from the external bus 116 may go through the BIU 106 read FIFO 154.

The system 54 may eliminate the need for a separate interface to the external bus for the EJTAG module. The system 54 may provide 64-bit debugging functionality with reduced cost overhead and die space. Additionally, the system 54 may simplify the CPU/EJTAG interface to the external bus.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising;
   a processor configured to support system-on-chip debugging;
   a nonintrusive debugging device configured to present or receive one or more test/control signals via a first bus; and
   an interface circuit coupled (i) between said processor and a second bus and (ii) between said nonintrusive debugging device and said second bus, wherein reading and writing commands of said processor are integrated with said system-on-chip debugging.

2. The apparatus according to claim 1, wherein (i) said nonintrusive debugging device comprises an EJTAG circuit and (ii) said processor comprises a central processing unit (CPU).

3. The apparatus according to claim 2, wherein said CPU and said EJTAG circuit are configured to access said second bus.

4. The apparatus according to claim 2, wherein said CPU and said interface circuit are configured to directly communicate data and instruction commands.

5. The apparatus according to claim 2, wherein said interface circuit and said CPU are configured to communicate through one or more instruction channels and one or more data channels.

6. The apparatus according to claim 2, wherein said interface comprises:

an external bus EJTAG interface circuit;

a write buffer:

a read buffer; and a multiplexer, wherein said read and write buffers are configured to interface with said second bus and said CPU.

7. The apparatus according to claim 6, wherein (i) said read buffer is configured to receive one or more read signals from said second bus and (ii) said write buffer is configured to present one or more write signals to said second bus.

8. The apparatus according to claim 1, wherein said processor is configured to perform 32-bit debugging.

9. The apparatus according to claim 1, wherein said apparatus is configured to perform 64-bit debugging.

10. The apparatus according to claim 1, wherein said interface comprises a bus interface unit.

11. An apparatus comprising:

means for supporting system-on-chip debugging in a processor;

means for presenting one or more test/control signals to a nonintrusive debugging device via a first bus;

means for interfacing between (i) said processor and a second bus and (ii) between said nonintrusive debugging device and said second bus; and means for integrating reading and writing commands of said processor with said system-on-chip debugging.

12. A method for providing an integrated nonintrusive debugging interface comprising the steps of:

(A) supporting system-on-chip debugging in a processor;

(B) presenting one or more test/control signals to a nonintrusive debugging device via a first bus;

(C) interfacing said nonintrusive debugging device with said processor via a second bus; and (D) integrating reading and writing commands of said processor with said system-on-chip debugging.

13. The method according to claim 12, wherein said nonintrusive debugging device comprises an EJTAG circuit, and said processor comprises a central processing unit (CPU).

14. The method according to claim 13, wherein said EJTAG circuit and said CPU are configured to access said second bus.

15. The method according to claim 12, wherein step (D) further comprises directly communicating data and instruction commands.

16. The method according to claim 12, wherein step (D) further comprises communicating through one or more instruction channels and one or more data channels.

17. The method according to claim 12, wherein step (A) comprises performing 64-bit debugging.

18. A computer readable medium configured to perform the steps of claim 12.

19. The apparatus of claim 1, wherein said first bus comprises an EJTAG interface bus.

20. The method of claim 12, wherein said first bus comprises an EJTAG interface bus.

21. The apparatus according to claim 1, wherein said processor comprises a reduced instruction set computer (RISC) processor.

* * * * *